United States Patent [19]

Petty et al.

[11] 3,926,874

[45] Dec. 16, 1975

[54] WATER REDUCIBLE PAINT COMPOSITION CONTAINING ALUMINUM METAL OR THE LIKE

[75] Inventors: John Lee Petty; George Minoru Amano, both of Detroit, Mich.

[73] Assignee: The Sherwin-Williams Company, Cleveland, Ohio

[22] Filed: Mar. 25, 1974

[21] Appl. No.: 454,582

[52] U.S. Cl. ..... 260/22 A; 260/29.2 E; 260/29.2 R; 260/29.2 EP; 260/29.3; 260/29.4 R; 260/29.6 S; 260/29.6 MM
[51] Int. Cl.² ... C09D 3/52; C09D 3/56; C09D 3/66; C09D 3/76
[58] Field of Search..... 260/29.6 S, 29.6 MM, 22 R, 260/22 A, 29.2 E, 29.2 R

[56] References Cited
UNITED STATES PATENTS

| 2,795,564 | 6/1957 | Conn et al. | 260/29.6 MM |
|---|---|---|---|
| 2,904,523 | 9/1959 | Hawkins et al. | 260/29.6 MM |
| 3,025,252 | 3/1962 | Jack | 260/29.6 MM |
| 3,244,542 | 4/1966 | Brown et al. | 260/29.6 MM |
| 3,494,882 | 2/1970 | Andrews | 260/22 A |
| 3,761,433 | 9/1973 | High | 260/22 A |
| 3,839,254 | 10/1974 | Fang | 260/29.6 MM |

*Primary Examiner*—Ronald W. Griffin
*Attorney, Agent, or Firm*—Harness, Dickey & Pierce

[57] ABSTRACT

A new water based coating composition which is specially stabilized to include a metal pigment which is normally reactive in an aqueous system.

16 Claims, No Drawings

WATER REDUCIBLE PAINT COMPOSITION CONTAINING ALUMINUM METAL OR THE LIKE

BACKGROUND OF THE INVENTION

This invention broadly relates to a new water based coating composition. More particularly this invention relates to a new water based coating composition which is stabilized such that it is able to utilize and include a reactive metal pigment such as aluminum.

In prior paint compositions which attempted to utilize reactive metal pigments such as aluminum, there has been a gassing and/or instability problem which resulted whenever such prior paint compositions came into contact with water or moisture. These prior paint compositions were generally solvent based compositions which did not include aqueous portions for the reason that if any water or moisture was introduced into these paint compositions, the problem was even more accentuated. When a reactive metal above hydrogen in the electromotive force (EMF) series is present with water in a paint system, the hydrogen gas formed destroys the paint as well as the paint container.

Accordingly one object of this invention is to provide a new paint composition which is water based and which includes reactive metal pigments such as aluminum or the like.

Another object of this invention is to provide a new water based paint composition wherein it is possible to include a reactive metal pigment in the paint and yet which paint composition is stable, e.g. does not deteriorate (does not gas) with age in the container.

Another object of the present invention is to provide a new one package water based coating composition which includes a reactive metal pigment.

Other objects, features and advantages of the present invention will become apparent from the subsequent description and the appended claims.

SUMMARY OF THE INVENTION

In accordance with this disclosure it has been discovered that a special modifying agent can be incorporated into a water based coating composition which includes a water reducible resin vehicle and water as well as a reactive metal pigment such as aluminum and, this modifying agent has been found to function within the paint composition such that the composition remains stable and the reactive metal pigment also remains stable and nonreactive within the composition. While the underlying theory of the invention and the reasons for the unusual results obtained are not completely understood, it is believed that the modifying agent preferentially wets the metal pigment such that it does not react with any aqueous materials in the compositions. Suffice it to say however that the invention provides highly advantageous coating compositions for the intended purposes of painting automotive parts or the like.

In one aspect, briefly stated, the present invention concerns a water based coating composition which is stabilized to include water reactive metal pigments, comprising in weight percent, (a) about 0.1% to about 80% of a particulated reactive metal pigment selected from at least one of the group consisting of aluminum, zinc, bronze, or reactive titanium containing pigments, (b) about 3% to about 40%, by weight of the metal pigment, of a modifying agent means for preferentially wetting the metal pigment so that it does not react with aqueous material in the composition, said modifying agent being water insoluble, non-ionizable, and having a surface tension of at least about 4 dynes per centimeter less than the aqueous phase of the composition, said modifying agent being selected from at least one of the group consisting of a polyamide, fatty amide, a fluorochemical surfactant, or a silicone surfactant, and said aqueous phase being as follows, (c) about 10% to about 75%, based on resin solids, of water reducible resin vehicle, (d) zero to about 45% solvent material for dissolving the resin vehicle, (e) and balance water.

DESCRIPTION OF PREFERRED EMBODIMENTS

The metal material or metal pigment is preferably a finely divided metal pigment such as aluminum, however, it may also be a metal material such as zinc particles or zinc dust, various bronze pigments, or certain titanium containing pigments which are reactive in aqueous paint systems. Most often the preferred metals are above hydrogen in the EMF series.

Some titanium pigments are reactive because they catalyze hydrolysis and aminolysis, etc. For example, some of such pigments are: duPont R-900, R-902, and R-960; and, American Cyanimid OR-560.

Broadly stated, this metal pigment material may be present in the composition within the range of about 0.1% up to about 80% by weight of the composition. Higher percentage amounts of the metal pigment are normally only used for special applications, such as for example, automotive muffler coatings and the like. One special application is known commercially as a zinc rich paint. Preferably, the metal pigment in the paint composition is present within the range of about 3% to about 20% by weight of the composition.

The modifying agent discovered for use herein is an agent which apparently wets the aluminum pigment or other metal pigments and the agent is such that it will not be displaced by the aqueous material in the composition. It is believed that this modifying agent serves the function of acting as an interfacial tension modifying agent and that it generally wets or surrounds the metal pigment such that the same does not come in contact with any water or moisture or is not displaced by the latter within the paint composition. As far as is known there has not been any prior art water based, time stable, coating composition which contained reactive metal pigments such as aluminum. The modifying agent should preferably be water insoluble, non-ionizable, and have a surface tension of at least about four dynes per centimeter less than the aqueous phase of the composition and preferably at least about five dynes per centimeter less than the aqueous phase of the composition.

The measurements of surface and interfacial tension as described herein may be made in accordance with testing procedures described in the following: "Interfacial Phenomena" by J. T. Davies and E. J. Rideal, Academic Press, New York, 1963, 2d Edition, Pages 42–49 or, see "Surface and Colloid Science" Vol. I, published by John Wiley and Sons, 1969, Pages 124–129 and 146–149.

Generally, it may be stated that the total water reducible paint system herein has a surface tension of approximately 30–40 dynes per centimeter. The water reducible resin system itself also has a surface tension of approximately 30–40 dynes per centimeter. Therefore, the modifying agent for use herein should broadly have a surface tension of about 18–26 dynes per centimeter and preferably a surface tension within the range of about 20–25 dynes per centimeter.

The polyamide resins used herein should preferably have a softening point of about 90°–170°C. (ASTM Test E-28-58T), an amine value between about 2 and about 10 (ASTM Test D-2074-66). The polyamide resin should also have a maximum interfacial tension value of 5 dynes per centimeter or less and preferably about 2–3 dynes/cm.

The modifying agent should be present within the overall paint composition between about 3% and about 40% by weight based on the amount of metal pigment present in the composition. Preferably, the amount of modifying agent should be within the range of about 10% to about 30% by weight of the metal pigment present.

The modifying agent for use herein should be one which interreacts with the reactive metal pigment in such a way that the metal is maintained separated from contact with the aqueous portion of the composition. The preferred modifying agent is a water insoluble non-ionizable polyamide resin. A particular fatty amide which may be used herein is oleamide (Kemamide U) having an average molecular weight of about 275, available from Humko Chemical Division. Other modifying agents which may be used are water insoluble non-ionizable fluorochemical surfactants, water insoluble non-ionizable silicone surfactants, and water insoluble non-ionizable fatty amides. The modifying agent used should preferably have the surface tension and interfacial tension characteristics discussed above. Commercially available materials for use as the modifying agent are: Polyamide No. 2433 (Lawter Chemicals Inc.); Emerez 1533, Emerez 1536 and Emerez 1550 (the Emerez resins are available from Emery Industries, Inc.); fluorochemical surfactant products FC-431 or FC-432 (available from Minnesota Mining & Mfg. Co.); and Monfluor fluorochemical surfactant (available from Imperial Chemicals Industries). Another type polyamide usable herein is a Winkler polyamide resin having a molecular weight between about 3000 and 9000 as described in Winkler U.S. Pat. No. 2,663,649 (incorporated herein by reference).

The water reducible resin vehicle for use in the composition of this invention may be selected from a large number of different such resin vehicles well known in the coating art. For example, the water reducible resin vehicle may be selected from at least one or more of a group consisting of an acrylic resin, a polyester resin, a vinyl resin, an amino resin, an epoxy-ester resin, a modified oil resin, a latex resin, a nitrile resin, a phenolic resin and polycarboxylic acid resin. Such water reducible resin vehicles are known in the paint art and the same are exemplified in the disclosures of U.S. Pat. Nos. 2,634,245; 2,941,968; 2,981,703; 2,992,197; 3,030,321; 3,067,158; 3,230,162; 3,251,790; 3,300,424; 3,351,675; 3,364,162; 3,366,563; and 3,761,433. The disclosures of these references are incorporated herein by reference and are typical of water based compositions which include water reducible resin vehicles. The preferred water reducible resin vehicle for use in this invention is an alkyd or polyester resin formulated to possess capacity to be so reduced and these are also well known in the paint art.

The amount of water reducible resin vehicle in the composition of this invention should be within the range of about 10% up to about 75% by weight of the composition and preferably it should be maintained within the range of about 15% to about 40% by weight of the composition. This percent by weight of the water reducible resin vehicle is based on the resin solids in the composition.

The solvent material for use in the composition of this invention may be any number of different materials. For example, the solvent may be ethylene glycol mono butyl ether, isobutanol, various glycol ethers, various other ether materials, and various alcohol materials, often referred to in the art as cosolvents. Numerous other solvents are also set forth in the patent references immediately above. In certain instances, the compositions of this invention do not require any solvent material, such as for example, certain water reducible resin vehicles for use herein can be solubilized in the water based composition by converting the resin vehicle to its salt form through the use of an amine type material such as ammonia which reacts with the resin vehicle (e.g. with the carboxyl groups) to convert it to a salt which is soluble in the water based composition without the requirement of any specific solvent material. Thus, the solvent material for use in the composition of the invention may be present within the range of about zero up to about 45% by weight of the composition, however preferably the solvent material is present within the range of about 2% to about 40% by weight of the composition.

Typical aluminum pigments (e.g. flake pigments) which are preferably utilized in this invention are the following commercially available materials: Reynolds LSA-918; Alcoa No. 226; Silberline L-228, and/or Reynolds Products Nos. 6-232 and 8-232. Powdered metal pigments are also workable in this invention.

The pH range for the coating composition of the invention should be maintained broadly within the range of about 6½ to 10. Preferably the pH of the coating composition should be maintained within the range of about 7–9. A unique point in accordance with this invention is that it is not necessary to closely maintain the pH of the paint (e.g. at 7.0) to avoid gassing caused by reaction of the metal pigment.

In order to further illustrate the invention, the following examples are provided. It is to be understood, however, that the examples are included for illustrative purposes and are not intended to be limiting of the scope of the invention as set forth in the sub-joined claims.

EXAMPLE 1

| | Parts by Weight | |
|---|---|---|
| n-butanol | 63.00 | Dissolve in Cowles |
| Polyamid P-2433 (Lawter) (polyamide resin) | 12.00 | |
| aluminum paste (65% wt. al. Metals Disintegrating Co. (MD-588) | 100.00 | Then add slowly-disperse for 30 min. and strain |
| water | 381.00 | Mix 10 min. before proceeding |

EXAMPLE 1-continued

| | Parts by Weight | |
|---|---|---|
| ammonium hydroxide (26° Be) | 10.00 | Then add in order |
| soya trimellitic anhydride alkyd resin* | 215.00 | resin (76% in solution) |
| formaldehyde | 1.50 | |
| cerium hex cem (Mooney) | 3.00 | drier |
| cobalt octoate | 5.00 | drier |
| cobalt phenanthroline soln. | 2.50 | catalyst |
| water | 50.00 | |
| ammonia | 3.00 | Premix - check pH after adding to batch pH - adjust batch to 8.0–8.5 |
| water | 27.00 | For viscosity adjustment |

*having an acid value of 57, and soya oil length of 32%.

EXAMPLE 2

| | Parts by Weight |
|---|---|
| aluminum paste MD-588 | 100 |
| n-butanol | 63 |
| Polymid 2433 | 12 |
| water | 300 |
| ammonia aqueous 26° Be | 10 |
| thermosetting acrylic resin | 230* |
| 37% formaldehyde | 1.50 |
| water | 50 |
| ammonia aqueous 26° Be | 3 |
| hexamethoxymethylmelamine | 52 |
| water | 64 |

*methacrylic acid modification - 8% acid value - 63.6

EXAMPLE 3

| | Parts by Weight |
|---|---|
| aluminum paste MD-588 | 100 |
| n-butanol | 63 |
| Polymid 2433 | 12 |
| water | 381 |
| ammonia aqueous 26° Be | 10 |
| epoxy-ester resin | 191* |
| 37% formaldehyde | 1.50 |
| cerium hex cem 6% (cerium octoate) | 3 |
| cobalt octoate 6% | 5 |
| cobalt phenanthroline soln. | 2.50 |
| water | 50 |
| ammonia aqueous 26° Be | 3 |
| water | 45.50 |

*Epon 1004 fatty acid ester resin, acid value 43

EXAMPLE 4

| | Parts by Weight |
|---|---|
| aluminum paste (Silberline L-228) | 135 |
| n-butanol | 60 |
| Polymid 2433 (Lawter Chemicals) | 15 |
| water | 237 |
| ammonia aqueous 26° Be | 17 |
| polyester resin* | 300 |
| N,N-dimethyl caprylamide-capramide** | 12 |
| 37% formaldehyde | 1.50 |
| water | 50 |
| ammonia aqueous 26° Be | 3 |
| hexamethoxymethylmelamine | 67 |
| water | 8 |

*WS 300, Amoco Oil-Free Resin
**Hallcomid M8-10, C.P. Hall Co.

EXAMPLE 5

| | Parts by Weight |
|---|---|
| aluminum paste MD-588 | 100 |
| n-butanol | 63 |
| Polymid 2433 | 12 |
| water | 331 |
| ammonia aqueous 26° Be | 10 |
| linseed fatty acid alkyd resin | 215* |
| 37% formaldehyde | 1.50 |
| cerium hex cem 6% (cerium octoate) | 3 |
| cobalt octoate 6% | 5 |
| cobalt phenanthroline soln. | 2.50 |
| water | 50 |
| ammonia aqueous 26° Be | 3 |
| water | 27 |

*Linseed fatty acid - 33% acid value - 58

EXAMPLE 6

| | Parts by Weight |
|---|---|
| n-butanol | 168 |
| Polymid 2433 | 32 |
| zinc dust | 838 |
| cabosil M-6 pyrogenic silica | 10 |
| water | 606 |
| ammonia aqueous 26° Be | 3 |
| soya alkyd resin* | 60 |
| cerium hex cem 6% (cerium octoate) | 1.50 |
| cobalt octoate 6% | 2.50 |
| cobalt phenanthroline soln. | 2 |

*soya oil - 32% acid value - 57

EXAMPLE 7

| | Parts by Weight |
|---|---|
| aluminum paste | 50 |
| odorless mineral spirits | 100 |
| Burnok 3840* | 34 |
| (Winkler polyamide resin) | |
| water | 335 |
| Morpholine | 2 |
| ammonia | 13 |
| soya TMA alkyd** | 300 |
| formaldehyde | 1.50 |
| cerium hex cem | 3 |
| cobalt orthophenanthroline | .50 |
| hexamethoxymelamine | 5 |

*Washburn's Burnok 3840
**Soya TMA alkyd (oil length 32% acid value 57)

EXAMPLE

| | |
|---|---|
| 8 | Same formulation as in Ex. 1 but use Kemamide U (Humko Products) in place of the Polymid 2433. |
| 9 | Same formulation as in Ex. 1 but use Kemamide E (Humko Products) in place of the Polymid 2433. |
| 10 | Same formulation as in Ex. 1 but use Emerez 1536 (Emery Industries) in place of the Polymid 2433. |
| 11 | Same formulation as in Ex. 1 but use Emerez 1550 (Emery Industries) in place of the Polymid 2433. |
| 12 | Same formulation as in Ex. 1 but use Emerez 1533 (Emery Industries) in place of the Polymid 2433. |
| 13 | Same formulation as in Ex. 2 but use Kemamide U (Humko Products) in place of the Polymid 2433. |
| 14 | Same formulation as in Ex. 2 but use Kemamide E (Humko Products) in place of the Polymid 2433. |
| 15 | Same formulation as in Ex. 2 but use Emerez 1536 (Emery Products) in place of the Polymid 2433. |

EXAMPLE-continued

| | |
|---|---|
| 16 | Same formulation as in Ex. 2 but use Emerez 1550 (Emery Products) in place of the polymid 2433 |
| 17 | Same formulation as in Ex. 2 but use Emerez 1533 (Emery Products) in place of the Polymid 2433. |
| 18 | Same formulation as in Ex. 3 but use Kemamide U (Humko Products) in place of the Polymid 2433. |
| 19 | Same formulation as in Ex. 3 but use Kemamide E (Humko Products) in place of the Polymid 2433. |
| 20 | Same formulation as in Ex. 3 but use Emerez 1536 (Emery Industries) in place of the Polymid 2433. |
| 21 | Same formulation as in Ex. 3 but use Emerez 1550 (Emery Industries) in place of the Polymid 2433. |
| 22 | Same formulation as in Ex. 3 but use Emerez 1533 (Emery Industries) in place of the Polymid 2433. |
| 23 | Same formulation as in Ex. 4 but use Kemamide U (Humko Products) in place of the Polymid 2433. |
| 24 | Same formulation as in Ex. 4 but use Kemamide E (Humko Products) in place of the Polymid 2433. |
| 25 | Same formulation as in Ex. 4 but use Emerez 1536 (Emery Industries) in place of the Polymid 2433. |
| 26 | Same formulation as in Ex. 4 but use Emerez 1550 (Emery Industries) in place of the Polymid 2433. |
| 27 | Same formulation as in Ex. 4 but use Emerez 1533 (Emery Industries in place of the Polymid 2433. |
| 28 | Same formulation as in Ex. 5 but use Kemamide U (Humko Products) in place of the Polymid 2433. |
| 29 | Same formulation as in Ex. 5 but use Kemamide E (Humko Products) in place of the Polymid 2433. |
| 30 | Same formulation as in Ex. 5 but use Emerez 1536 (Emery Industries) in place of the Polymid 2433. |
| 31 | Same formulation as in Ex. 5 but use Emerez 1550 (Emery Industries) in place of the Polymid 2433. |
| 32 | Same formulation as in Ex. 5 but use Emerez 1533 (Emery Industries) in place of the Polymid 2433. |
| 33 | Same formulation as in Ex. 6 but use Kemamide U (Humko Products) in place of the Polymid 2433. |
| 34 | Same formulation as in Ex. 6 but use Kemamide E (Humko Products) in place of the Polymid 2433. |
| 35 | Same formulation as in Ex. 6 but use Emerez 1536 (Emery Industries) in place of the Polymid 2433. |
| 36 | Same formulation as in Ex. 6 but use Emerez 1550 (Emery Industries) in place of the Polymid 2433. |
| 37 | Same formulation as in Ex. 6 but use Emerez 1533 (Emery Industries) in place of the Polymid 2433. |

While it will be apparent that the preferred embodiments of the invention disclosed are well calculated to fulfill the objects above-stated, it will be appreciated that the invention is susceptible to modification, variation and change without departing from the proper scope or fair meaning of the sub-joined claims.

What is claimed is:

1. A water based coating composition which is stabilized to include water reactive metallic pigment, comprising in weight percent.
   a. about 0.1% to about 80% of a particulated reactive metallic pigment selected from at least one of the group consisting of aluminum, zinc, bronze, or reactive titanium containing pigments,
   b. about 3% to about 40%, by weight of the metallic pigment, of a modifying agent means for preferentially wetting the metallic pigment so that it does not react with aqueous material in the composition, said modifying agent being water insoluble, non-ionizable, and having a surface tension of at least about 4 dynes per centimeter less than the aqueous phase of the composition, said modifying agent being selected from at least one of the group consisting of a polyamide, fatty amide, a fluorochemical surfactant, or a silicone surfactant, and said aqueous phase being as follows,
   c. about 10% to about 75%, based on resin solids, of water reducible resin vehicle,
   d. zero to about 45% solvent material for dissolving the resin vehicle,
   e. and balance water.

2. The composition of claim 1 wherein, said metallic pigment is substantially aluminum.

3. The composition of claim 2 wherein, said component (a) percentage range is about 3% to about 20%, said component (b) percentage range is about 10% to about 30%, said component (c) percentage range is about 15% to about 40%, said component (d) percentage range is about 2% to about 40%.

4. The composition of claim 2 wherein, said water reducible resin is comprised of a polyester resin.

5. The composition of claim 2 wherein, said surface tension is at least about 5 dynes per centimeter less than the aqueous phase.

6. The composition of claim 1 wherein, said modifying agent is a polyamide of fluorochemical surfactant.

7. A water based coating composition which is stabilized to include reactive metallic pigment, comprising in weight percent,
   a. about 0.1% to about 80% of a particulated reactive metallic pigment,
   b. about 3% to about 40%, by weight of the metallic pigment, of a modifying agent, said modifying agent being water insoluble, and non-ionizable, said modifying agent being selected from at least one of the group consisting of a polyamide, or a fluorochemical surfactant,
   c. about 10% to about 75%, based on resin solids, of water reducible resin vehicle,
   d. zero to about 45% solvent material for dissolving the resin vehicle,
   e. and balance water.

8. The composition of claim 7 wherein, said metallic pigment is substantially aluminum.

9. The composition of claim 7 wherein, said modifying agent is a polyamide.

10. The composition claim 9 wherein, said modifying agent is a polyamide having,
    a softening point of about 90°-170°C.,
    an acid value of about 2 to about 8, and
    an amine value of less than about 5.

11. The composition of claim 7 wherein, the modifying agent has a surface tension of at least about 5 dynes per centimeter less than the aqueous phase of the composition.

12. A water based coating composition which is stabilized to include water reactive metallic pigment, comprising in weight percent,
    a. about 0.1% to about 80% of a particulate metallic pigment selected from at least one of the group consisting of aluminum, zinc, bronze, or reactive titanium containing pigments,
    b. about 3% to about 40%, by weight of the metallic pigment, of a modifying agent means for preferentially wetting the metallic pigment so that it does not react with aqueous material in the composition, said modifying agent being water insoluble, non-ionizable, and having a surface tension of at least about 4 dynes per centimeter less than the aqueous phase of the composition, said aqueous phase being as follows,
    c. about 10% to about 75%, based on resin solids, of water reducible resin vehicle, d. zero to about 45% solvent material for dissolving the resin vehicle,
e. and balance water.

13. A water based coating composition which is stabilized to include reactive metallic pigment, comprising in weight percent,
   a. about 0.1% to about 80% of a particulated reactive metallic pigment,
   b. about 3% to about 40%, by weight of the metallic pigment, of a modifying agent, said modifying agent being water insoluble, and non-ionizable and being effective to keep the reactive metallic pigment separated from the water in the composition, said modifying agent having a surface tension of at least about four dynes per centimeter less than the aqueous phase of the composition,
   c. about 10% to about 75%, based on resin solids, of water reducible resin vehicle,
   d. zero to about 45% solvent material for dissolving the resin vehicle,
   e. and balance water.

14. The composition of claim 13 wherein, said modifying agent is selected from at least one material of the group consisting of a polyamide, fluorochemical surfactant, or a silicone surfactant.

15. The composition of claim 13 wherein, said modifying agent is selected from at least one material of the group consisting of a polyamide or a fluorochemical surfactant.

16. The composition of claim 13 wherein, said metallic pigment is substantially of aluminum.

* * * * *